United States Patent [19]

Inaba et al.

[11] Patent Number: 5,609,940
[45] Date of Patent: Mar. 11, 1997

[54] POLYMER PANEL WITH A SEALING MEMBRANE FOR MECHANICAL AND ELECTRICAL CONNECTIONS

[75] Inventors: Koichi Inaba, Zama; Kensuke Uchida, Tokyo, both of Japan; Raymond F. Kolberg, Rochester Hills, Mich.

[73] Assignee: General Electric Company, Pittsfield, Mass.

[21] Appl. No.: 84,653

[22] Filed: Jun. 28, 1993

[51] Int. Cl.⁶ ........................................ B32B 3/00
[52] U.S. Cl. .................. 428/156; 428/131; 428/137; 428/155; 428/167; 428/172; 428/213; 428/297.4; 264/167; 264/241; 264/257; 442/394; 442/398
[58] Field of Search ............... 428/156, 192, 428/167, 74, 76, 113, 131, 137, 141, 155, 172, 212, 213, 245, 289, 412; 264/257, 297.2, 510, 167, 241; 296/146.1, 901

[56] References Cited

U.S. PATENT DOCUMENTS

| | | | |
|---|---|---|---|
| 2,948,937 | 8/1960 | Rapata | 24/73 |
| 3,038,730 | 6/1962 | Bentley | 277/4 |
| 4,431,696 | 2/1984 | Di Drusco et al. | 428/212 |
| 4,548,863 | 10/1985 | Hicks et al. | 428/325 |
| 4,695,506 | 9/1987 | Dehannau et al. | 428/212 |
| 4,781,956 | 11/1988 | Zimmermann et al. | 428/43 |
| 4,788,088 | 11/1988 | Kohl | 428/34.5 |
| 4,866,883 | 9/1989 | Brown et al. | 49/502 |
| 4,916,937 | 4/1990 | Robertson et al. | 405/270 |
| 5,036,632 | 8/1991 | Short et al. | 52/1 |
| 5,040,334 | 8/1991 | Dossin et al. | 49/502 |
| 5,050,351 | 9/1991 | Goldbach et al. | 49/502 |

FOREIGN PATENT DOCUMENTS

| | | |
|---|---|---|
| 3145550A1 | 5/1983 | Germany . |
| 3522969C2 | 1/1987 | Germany . |
| 8629683U1 | 2/1987 | Germany . |
| 3627266A1 | 2/1988 | Germany . |
| 3931452A1 | 4/1991 | Germany . |
| 4035658A1 | 5/1992 | Germany . |
| 4309928A1 | 9/1994 | Germany . |

OTHER PUBLICATIONS

German Utility Model 69 49 006 Dec. 1969.
German Utility Model 17 22 003.

*Primary Examiner*—Donald J. Loney

[57] ABSTRACT

The present invention relates to a polymer panel with a sealing membrane for making electrical and mechanical connections through the panel. The invention further relates to a method of processing such panel.

25 Claims, 1 Drawing Sheet

POLYMER PANEL WITH A SEALING MEMBRANE FOR MECHANICAL AND ELECTRICAL CONNECTIONS

CROSS-REFERENCE TO RELATED APPLICATIONS

This application is related to our application Ser. No. 08/084,038, now U.S. Pat. No. 544,699 (Attorney Docket No. 8CT-5429), application Ser. No. 08/084,043, abandoned (Attorney Docket No. 8CT-5430), and application Ser. No. 08/084,042, now U.S. Pat. No. 5,387,391 (Attorney Docket No. 8CT-5428), filed concurrently, the entire contents of which are incorporated herein by reference.

BACKGROUND OF THE INVENTION

1. Field of the Invention

The present invention relates to a polymer panel with a sealing membrane for making electrical and mechanical connections through the panel. The invention further relates to a method of processing such panel.

2. Technology Review

Traditionally, vehicle door assemblies have been made out of an outside panel 3 and an inside panel 2, see FIG. 1, which are stamped from steel and welded together using many smaller pieces of steel for additional structural performance. The metals depending on the thickness give good stiffness. Further, these assemblies have included a means for sealing the interior passenger compartment from the exterior moisture. This sealing means generally takes the form of a piece of plastic film 5, or the use of grommets or sealants to seal the holes for mechanical or electrical connections made in the inside door panel 2.

With the increased demand for fuel efficiency, however, automobile manufacturers have in recent years looked for new materials to replace these traditional materials in automobiles. The materials of choice for most automobile manufacturers have been polymers. Manufacturers have attempted to integrate polymers anywhere they could in the structure and the body of the car to reduce the weight, and therefore increase the fuel efficiency. Manufacturers realized that a significant reduction in weight could be obtained by reducing the weight of the door panels. Therefore manufacturers have produced vehicle door panels which are either partly or entirely made out of polymer resins for this purpose.

One of the drawbacks of using polymers is the moduli of elasticity of polymers. Because of the low modulus of elasticity relative to traditional steel, polymers are sometimes considered to lack the stiffness required for automobile body parts. This drawback has been partially solved by the addition of fillers to the polymer resin which increases the modulus of elasticity and therefore the stiffness.

Conventionally, when a panel 2 is molded from resin, it creates the need to add an additional process step to cut a hole into the inner panel to allow for the mechanical or electrical connections. Additionally, if a hole is molded into the panel 2 by injection molding, the hole must be sealed with a grommet or weatherseal material such as a rubber gasket because resin does not flow smoothly around the hole and cracks often occur around the periphery of the hole.

The additional processing steps of cutting access holes result in an additional manufacturing expense, and wasted material which must be cut out of the panel. The door then like a metal door must be sealed with a plastic sheet or the holes must be sealed with a grommet or a gasket to maintain a good weatherseal between the exterior side surface of the panel 4 and the interior side surface of the panel 5. These additional processing steps increase the costs for parts, labor and assembly.

SUMMARY OF THE INVENTION

The present invention provides for a panel with a sealing membrane for making electrical and mechanical connections through the panel. The invention includes a article of manufacture comprising: a polymer panel, the panel having at least one thin polymer membrane section wherein said membrane is continuous with the panel, and has a modulus of elasticity and a thickness such that said membrane forms a seal against an object inserted through said membrane. The present invention further includes a method of making the above panel with the membrane(s).

DETAILED DESCRIPTION OF THE INVENTION

Figure 1:
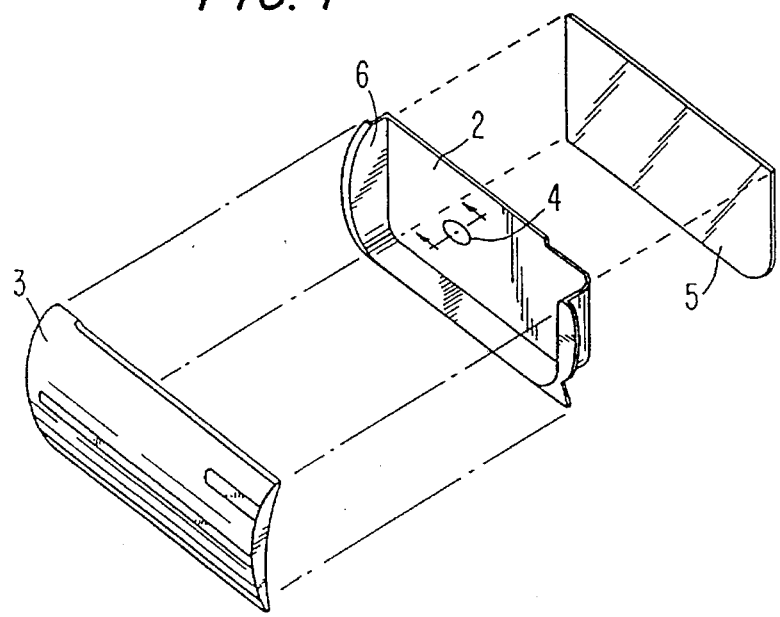
FIG. 1 is a perspective view of an vehicle door assembly.

The present invention shown in FIG. 1 is a panel 2 with at least one membrane 4 functioning as a sealing penetration slit through which electrical and mechanical connections can be made. The panel has a large number of applications. Examples of uses for these panels include computers and automobiles. These examples are, however, given by way of illustration and not by way of limitation. The uses for this panel 2 are meant to include those applications which are evident to those skilled in the art. The panel 2 can be used in most applications where electrical or mechanical connections have to be made through a panel and where there is a need for a dust or moisture barrier.

FIG. 1 shows a vehicle door assembly. The panel 2 of the vehicle door assembly has a large flange extending on three sides of the panel 2. The panel 2 can have a membrane 4 anywhere required in the panel 2 even including the flange 6. Therefore a membrane 4 can be created anywhere in the panel a electrical or mechanical connection has to be made.

The panel is produced from either a unfilled polymer or a filled polymer. Polymers which can be used to produce the inside panel include but are not limited to the following examples. These include polyphenylene oxide (PPO), polyphenylene oxide/polystyrene (PPO/PS) blends, polycarbonate/acrylonitrile butadiene styrene (PC/ABS) copolymers, thermoplastic polyolefins (TPO), polypropylene (PP), vinyl esters, polyurethanes and polycarbonate/polybutadiene terephthalate (PC/PBT) blends. The preferred polymers are polycarbonate/polybutadiene terephthalate (PC/PBT) blends.

The polymers can be the virgin polymer or can be heavily filled. The higher the fill generally the greater the modulus of elasticity which improves stiffness. Filled polymers might be required for structural applications.

The fillers which can be used in the polymer resin to produce the inside panel include but are not limited to the following examples. These include short glass fibers, mineral fibers, minerals such as talc, and any fibrous filler with an aspect ratio greater than 1:1. The preferred fillers are continuous glass mat reinforcement materials.

If the panel is used in a vehicle door assembly, see FIG. 1, then the panel 2 is connected by a connecting means to a outside panel 3. The outside panel 3 can be made from a metal or a polymer. The connecting means are those known in the art, and those incorporated by reference from the concurrent applications filed.

Figure 2:
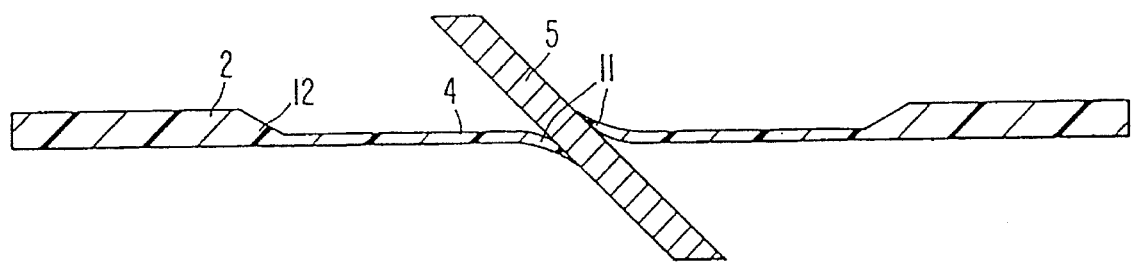
FIG. 2 is a cross-sectional view of a panel with a membrane with a metal rod connected through and sealed by the membrane.

FIG. 2 is a cross-sectional view of a membrane 4 and the panel 2 surrounding the membrane. In FIG. 2, the membrane 4 is continuous with the panel 2. The membrane is used for creating a sealing penetration slit 7 (FIG. 3) for making electrical and/or mechanical connections. In FIG. 2, for example, a metal rod 15 for the operation of a conventional doorlock device (not shown) is connected through the membrane 4. The slit is formed in the sliding direction of the rod 15. The membrane 4 forms a seal 11 with the metal rod 15. The outside of membrane 4 forms the bottom part of a recess or concave region in the panel to minimize the possibility of water drops coming through the slit.

The quality of the seal 11 is based on two factors. The first factor is the modulus of elasticity of the material in the membrane, and the second is the thickness of the membrane. If either the modulus of elasticity or the thickness are too high the membrane will not form a good seal. If the membrane is too thin the membrane will have a tendency to break or tear. Generally, the quality of the seal 11 is based upon the requirements of the situation, therefore the combination of the modulus of elasticity and the thickness of the membrane is also based upon the situation also. It is preferred, however, that the thickness of the membrane 4 be from about 0.001 to about 0.020 inches, and it is most preferred that the thickness of the membrane 4 be from about 0.001 to about 0.010 inches. It is preferred that the modulus of elasticity of the polymer of the membrane 4 be less than 500,000 psi, and most preferred that the modulus of elasticity of the polymer of the membrane 4 be less than 250,000 psi.

Figure 3:
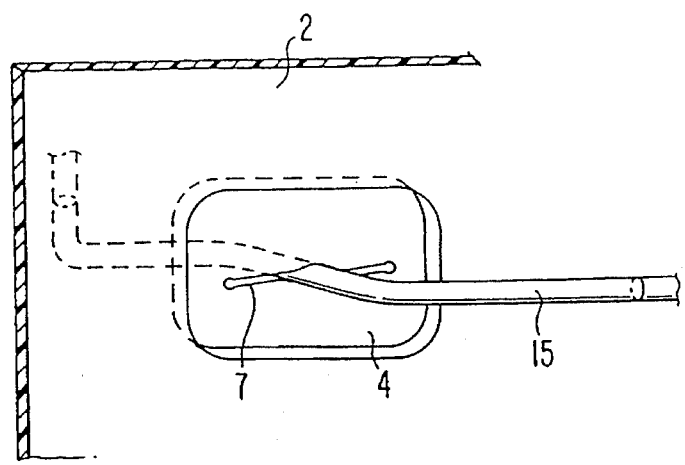
FIG. 3 is an elevational view of the membrane with the sealing penetration slit.

FIG. 3 is a elevational view of a portion of a panel provided with a membrane according to the invention. In FIG. 3, the membrane 4 is continuous with the panel 2 and a penetration slit 7 is located in the membrane. The penetration slit 7 can be preformed by notching the membrane 4 during or after molding whereby the end user just has to apply a bending moment at the slit 7 to open it before making a mechanical or electrical connection through the slit 7. The penetration slit 7 can further be cut into the membrane 4 using a sharp object such as for example a razor blade.

The panel 2 in FIG. 1 can be formed by compression molding or by injection molding. In compression molding using a thermosetting compound, the polymer blank is exposed to sufficient heat to soften or plasticize the blank sufficiently for it to flow into the mold cavity. The fluid plastic is held under pressure for a sufficient length of time for the material to polymerize or cross-link and harden. In injection molding, a thermosetting or a thermoplastic is heated and then injected under pressure at a low enough viscosity for the polymer to completely fill the mold.

If the panel is compression molded using a thermoplastic preformed flat polymer blank, the blank is formed with reinforcement in the blank. The blank is also formed with portions cut out in the areas where the membranes 4 are to be formed. The blank is then heated prior to insertion in the tool to the degree necessary to allow it to flow into the mold cavity. The mold cavity is designed such that the portion of the cavity corresponding to the membrane is necked down in such a way as to not allow any significant amount of filler into that portion of the cavity corresponding to the membrane of the panel. The polymer blank is then compressed forcing the blank to take the shape of the panel, and squeezing polymer into the cavity corresponding to the membrane of the panel.

With injection molding, a polymer filled or unfilled is heated to a required viscosity then injected into a mold. Again, the mold cavity is designed such that the portion of the cavity corresponding to the membrane is necked down in such a way as to not allow any significant amount of filler into the portion of the cavity corresponding to the membrane of the panel. The polymer injected into the mold forcing the resin to take the shape of the panel, and squeezing polymer into the cavity corresponding to the membrane of the panel.

With injection molding if for example a continuous glass fiber mat or a fabric is used for reinforcement, the reinforcement must be placed in the mold before injecting the polymer. The polymer, a reaction injection molding thermoset, in this situation must have a much lower viscosity in order to penetrate in and around the mat or fabric.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. An article of manufacture comprising a molded polymer panel having at least one thin molded polymer membrane section wherein said membrane section is molded continuous with the panel and the membrane section has a modulus of elasticity of less than 500,000 psi and a thickness from about 0.001 to about 0.020 inches whereby said membrane section forms a seal against an object inserted through said membrane section.

2. The article in claim 1, wherein said polymer panel contains filler and said membrane section contains little or no filler.

3. The article in claim 2, wherein said filler is selected from a group consisting of glass fiber, mineral fiber, minerals and continuous fiber mat.

4. The article in claim 3, wherein said filler is glass fiber.

5. The article in claim 3, wherein said filler is mineral fiber.

6. The article in claim 3, wherein said filler is minerals.

7. The article in claim 3, wherein said filler is a continuous fiber mat.

8. The article in claim 1, said polymer membrane section is notched.

9. The article in claim 1, wherein said membrane section has a slit for a rod member to penetrate there through.

10. A molding process for producing the article in claim 1 comprising the steps of:

a) heating a filled polymer preform;

b) compressing the polymer preform in a mold having a cavity to form a panel with a membrane section wherein a portion of the cavity is shaped to not allow any significant amount of filler into the portion of the cavity corresponding to the membrane of the panel whereby the membrane contains little or no filler; and c) cooling the panel.

11. The molding process in claim 10, wherein said polymer is selected from a group consisting of polyphenylene oxide, polyphenylene oxide/polystyrene blends, polycarbonate/acrylonitrile butadiene styrene copolymers, polypropylene, vinyl esters, polyurethanes and polycarbonate/polybutadiene terephthalate blends.

12. The molding process in claim 10, wherein said filled polymer contains glass fibers.

13. The molding process in claim 10, wherein said filled polymer contains mineral fibers.

14. The molding process, in claim 10, wherein said filled polymer contains minerals.

15. The molding process in claim 10, wherein said filled polymer is filled with a continuous fiber mat.

16. A molding process for producing the article in claim 1 comprising the steps of:
   a) heating a filled polymer;
   b) injecting the polymer into a mold having a cavity to form a panel with a membrane section wherein a portion of the cavity is shaped to not allow any significant amount of filler into the portion of the cavity corresponding to the membrane of the panel whereby the membrane contains little or no filler; and
   c) cooling the panel.

17. The molding process in claim 16, wherein the polymer is selected from a group consisting of polyphenylene oxide, polyphenylene oxide/polystyrene blends, polycarbonate/acrylonitrile butadiene styrene copolymers, polypropylene, and polycarbonate/polybutadiene terephthalate blends.

18. The molding process in claim 16, wherein said filled polymer contains glass fibers.

19. The molding process in claim 16, wherein said filled polymer contains mineral fibers.

20. The molding process in claim 16, wherein said filled polymer contains minerals.

21. A molding process for producing the article in claim 1 comprising the steps of:
   a) placing a continuous fiber mat into a mold:
   b) heating a thermoset polymer;
   c) injecting the polymer into a mold to form a panel with a membrane section; and
   d) cooling the panel.

22. The article in claim 1 which is a vehicle door panel.

23. The article in claim 22 wherein an electrical or mechanical connection is made through the polymer membrane whereby the membrane provides a dust and moisture barrier.

24. The article in claim 22 wherein the polymer membrane section has a slit.

25. The article in claim 24 wherein the slit functions as a sealing penetration slit.

* * * * *